(12) United States Patent
Tsunehara

(10) Patent No.: US 6,910,747 B2
(45) Date of Patent: Jun. 28, 2005

(54) VEHICLE BRAKING CONTROL SYSTEM

(75) Inventor: Hiroshi Tsunehara, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/678,189

(22) Filed: Oct. 6, 2003

(65) Prior Publication Data

US 2004/0108771 A1 Jun. 10, 2004

(30) Foreign Application Priority Data

Dec. 10, 2002 (JP) ......................................... 2002-357721

(51) Int. Cl.⁷ .............................................. B60T 13/74
(52) U.S. Cl. .......................................... 303/152; 303/3
(58) Field of Search ............................. 303/3, 15, 152; 180/65.1–65.5

(56) References Cited

U.S. PATENT DOCUMENTS

| | | | |
|---|---|---|---|
| 5,399,000 A | * 3/1995 | Aoki et al. | 303/3 |
| 5,450,324 A | * 9/1995 | Cikanek | 701/108 |
| 5,476,310 A | * 12/1995 | Ohtsu et al. | 303/3 |
| 5,511,859 A | * 4/1996 | Kade et al. | 303/3 |
| 5,615,933 A | * 4/1997 | Kidston et al. | 303/152 |
| 5,632,534 A | * 5/1997 | Knechtges | 303/152 |
| 5,707,115 A | * 1/1998 | Bodie et al. | 303/3 |
| 5,839,800 A | * 11/1998 | Koga et al. | 303/152 |
| 5,967,621 A | * 10/1999 | Ito et al. | 303/15 |
| 6,076,899 A | * 6/2000 | Isella | 303/152 |
| 6,120,115 A | * 9/2000 | Manabe | 303/152 |
| 6,216,808 B1 | * 4/2001 | Kuno et al. | 180/65.3 |
| 5,318,355 A1 | * 11/2001 | Shiga | 303/3 |
| 6,325,470 B1 | * 12/2001 | Schneider | 303/152 |
| 6,663,197 B2 | * 12/2003 | Joyce | 303/152 |

FOREIGN PATENT DOCUMENTS

| | | |
|---|---|---|
| JP | 2000-255401 A | 9/2000 |
| JP | 2002-106619 A | 4/2002 |

* cited by examiner

*Primary Examiner*—Christopher P. Schwartz
(74) *Attorney, Agent, or Firm*—Shinjyu Global IP Counselors, LLP

(57) ABSTRACT

A vehicle braking control system is provided that controls at least three braking devices including a regenerative braking device, a hydraulic braking device and an electric braking device. The vehicle braking control system basically comprises a braking mode selecting section, a required braking force determining section and a target braking force setting section. The braking mode selecting section sets one of a plurality of braking modes having a different braking control priority for each of the target braking forces. The required braking force determining section determines a required braking force for an entire vehicle. The target braking force setting section sets each of the target braking forces based on the braking control priority of the selected braking mode to produce the required braking force for the entire vehicle. Preferably, the braking mode selecting section set at least an electric power maintenance priority mode and a braking response priority mode.

28 Claims, 7 Drawing Sheets

VEHICLE BRAKING CONTROL SYSTEM

BACKGROUND OF THE INVENTION

1. Field of the Invention

The present invention generally relates to a vehicle braking control system that controls a plurality of braking devices or systems. More specifically, the present invention relates to a vehicle braking control system with excellent control response characteristics, and that comprises at least three braking devices including a regenerative braking device, a hydraulic braking device and an electric braking device.

2. Background Information

Previously, a vehicle has been proposed that is equipped with both a hydraulic braking system and an electric braking system for applying a braking force for the entire vehicle. One example of such a vehicle equipped with both hydraulic and electric braking systems is described in Japanese Laid-Open Patent Publication No. 2000-255401. The vehicle disclosed in this publication has the hydraulic braking system configured to serve as a front wheel braking system and the electric braking systems serve as a rear wheel braking system.

In view of the above, it will be apparent to those skilled in the art from this disclosure that there exists a need for an improved vehicle braking control system. This invention addresses this need in the art as well as other needs, which will become apparent to those skilled in the art from this disclosure.

SUMMARY OF THE INVENTION

It has been discovered that both hydraulic braking devices and electric braking devices consume electric power and that the energy efficiency for the entire vehicle is reduced by the power consumption of using both of these types of braking devices independently. In particular, hydraulic braking devices consume electric power in the sense that they require electric power for hydraulic pressure control even though the wheels are braked by a brake unit that responds to hydraulic pressure. The electric braking device requires electric power in order to brake the wheels with a brake unit operated by electric power. These conventional vehicle braking devices are used together in such a manner that they do not allow the energy efficiency for the entire vehicle to be taken into account.

Therefore, not only is the energy efficiency for the entire vehicle poor, but batteries and large generators that can supplement power consumption by using two braking devices must also be placed onboard the vehicle. Thus, concerns arise in that the configuration is disadvantageous with regard to cost, and the engine fuel consumption for driving the generators worsens.

In view of the above, it is conceivable that, in addition to the two above-noted braking devices, providing a regenerative braking device that brakes the wheels by converting the kinetic energy of the vehicle into electric energy, which is known in the art (Japanese Laid-Open Patent Publication No. 2002-106619, and other publications), and storing the subsequently derived electric energy (electric power) in a battery during the operation of the regenerative braking device, can improve the energy efficiency for the entire vehicle.

An object of the present invention is to provide a vehicle braking system that comprises a regenerative braking device, a hydraulic braking device, and an electric braking device, which are configured to provide excellent control response characteristics in this manner.

To achieve this objective, the vehicle braking control system according to the present invention is provided that basically comprises a braking mode selecting section, a required braking force determining section and a target braking force setting section. The braking mode selecting section is configured to set one of a plurality of braking modes as a selected braking mode, with each of the braking modes having a different braking control priority for setting a target regenerative braking force, a target hydraulic braking force and a target electric braking force. The required braking force determining section is configured to determine a required braking force for an entire vehicle. The target braking force setting section is configured to set the target regenerative braking force, the target hydraulic braking force, and the target electric braking force based on the braking control priority of the selected braking mode to produce the required braking force for the entire vehicle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
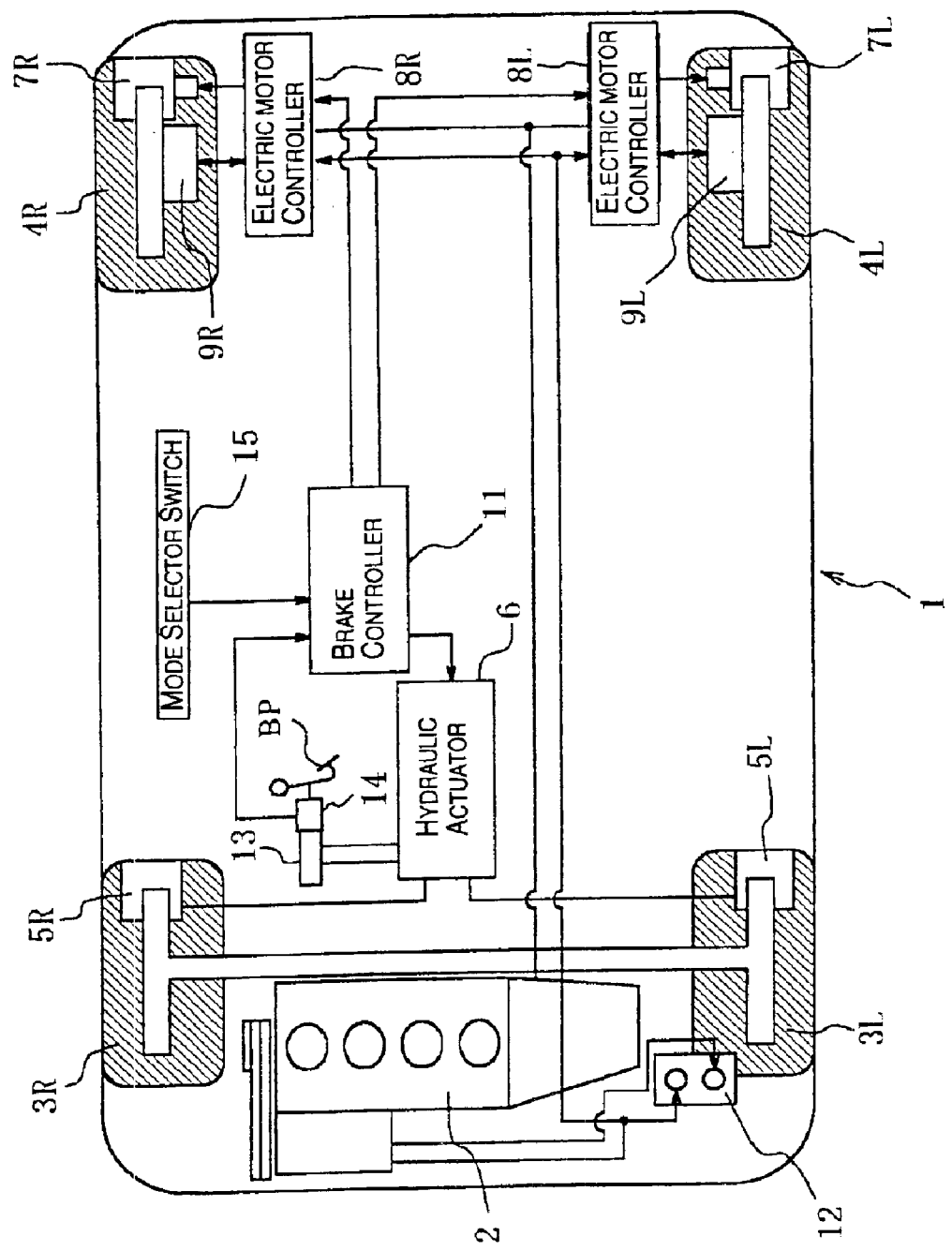
FIG. 1 is a schematic block diagram of a vehicle equipped with a vehicle braking control system in accordance with one embodiment of the present invention.

Referring initially to FIG. 1, a vehicle 1 is diagrammatically illustrated that is equipped with a vehicle braking control system in accordance with a first embodiment of the present invention. The vehicle 1 includes an engine 2, a pair of (left and right) front wheels 3L and 3R and a pair of (left and right) rear wheels 4L and 4R. While the vehicle 1 is illustrated as a front wheel drive vehicle, the present invention can be used with rear wheel drive and four wheel drive vehicles.

The vehicle braking system of the present embodiment is configured and arranged such that the left and right front wheels 3L and 3R are each respectively braked by a hydraulic braking device having a pair of hydraulic caliper brakes 5L and 5R, and a hydraulic actuator 6 connected in common to both of the hydraulic caliper brakes 5L and 5R. The vehicle braking system is further configured and arranged such that the left and right rear wheels 4L and 4R are each respectively braked by an electric braking device and a regenerative braking device. The electric braking device for the left rear wheel 4L includes an electric caliper brake 7L and an electric motor controller 8L for controlling the electric caliper brake 7L. The electric braking device for the right rear wheel 4R includes an electric caliper brake 7R and an electric motor controller 8R for controlling the electric caliper brake 7R. The regenerative braking device for the left rear wheel 4L includes an alternating synchronous motor 9L (regenerative brake), and the electric motor controllers 8L for controlling the alternating synchronous motor 9L. The regenerative braking device for the right rear wheel 4R includes an alternating synchronous motor 9R(regenerative brake), and the electric motor controllers 8R for controlling the alternating synchronous motor 9R. Thus, the electric motor controller 8L is used to control both of the left electric braking device and the left regenerative braking device for applying braking forces to the left rear wheel 4L. Similarly, the electric motor controller 8R is used to control both of the right electric braking device and the right regenerative braking device for applying braking forces to the right rear wheel 4R.

The hydraulic actuator 6 incorporates a pressure source (not depicted). The hydraulic actuator 6 reacts to the target hydraulic braking force related to the left and right front wheels 3L and 3R from the brake controller 11. The hydraulic actuator 6 supplies the corresponding hydraulic pressure to the-hydraulic caliper brakes 5L and 5R of the left and right front wheels 3L and 3R.

The electric motor controllers 8L and 8R are interconnected with an onboard battery 12, the electric caliper brakes 7L and 7R of the left and right rear wheels 4L and 4R, and the alternating synchronous motors 9L and 9R. Thus, the electric motor controllers 8L and 8R react to the target regenerative braking force and the target electric braking force set for the left and right rear wheels 4L and 4R by the brake controller 11 to individually brake the left and right rear wheels 4L and 4R as described below.

In other words, the electric motor controllers 8L and 8R supply electric power consistent with a target electric braking force from the onboard battery 12 to the corresponding electric caliper brakes 7L and 7R, and thus, provide the target electric braking force to the left and right rear wheels 4L and 4R. The electric motor controllers 8L and 8R are further configured and arranged to apply a power generation load to the alternating synchronous motors 9L and 9R so that a target regenerative braking force is provided to the left and right rear wheels 4L and 4R. The power generated by the alternating synchronous motors 9L and 9R is then stored in the onboard battery 12. Of course, a single alternating synchronous motor or regenerative brake device can be used for the alternating synchronous motors 9L and 9R, as illustrated.

The interval between the hydraulic pressure actuator 6 and the brake pedal BP is also hydraulically correlated by way of the master cylinder 13 that reacts to the pressure on the brake pedal BP, and this generates a reaction force to the pressure on the brake pedal BP to allow the driver to feel normal brake operation. When the braking system of the hydraulic braking device malfunctions, the left and right front wheels 3L and 3R can be directly braked with hydraulic pressure from the master cylinder 13 without relying on the target hydraulic braking force from the brake controller 11 to the hydraulic pressure actuator 6.

The vehicle braking system of the present embodiment is further configured and arranged to include a stroke sensor 14 and a braking mode selection switch 15. The stroke sensor 14 is configured and arranged to detect the depression amount or downward force on the brake pedal BP and produce a control signal indicative of the depression amount or force on the brake pedal BP. The braking mode selection switch 15 is preferably configured and arranged to be manually operated by the driver and produce a control signal indicative of the selected mode. A signal from the braking mode selection switch 15 and a signal from the stroke sensor 14 are input to the brake controller 11 in order to compute the target hydraulic braking force, the target electric braking force, and the target regenerative braking force.

The braking mode selection switch 15 has two operating positions related to the electric power maintenance priority mode and the braking response priority mode. For example, when the driver desires to reduce the power consumed and increase the power generated by regenerative braking to maintain the electric power of the battery 12, the braking mode switch 15 is set to the electric power maintenance priority mode position. Alternatively, when the driver desires a high generated response of the braking force during braking operation, the braking mode switch 15 is set to the braking response priority mode position.

While only an electric power maintenance priority mode and a braking response priority mode were described as braking modes above, it will be apparent to those skilled in the art from this disclosure that other braking modes other than these may be set as needed and/or desired.

When setting either of the braking modes, it will be apparent to those skilled in the art from this disclosure that the braking mode can be automatically selected in accordance with the driving condition of the vehicle in lieu of being manually selected by the driver. Thus, the braking mode selection switch 15 is preferably configured and arranged to be either manually operated by the driver or automatically operated based on a driving condition. In either case, the braking mode selection switch 15 produces a control signal indicative of the selected mode.

Figure 2:
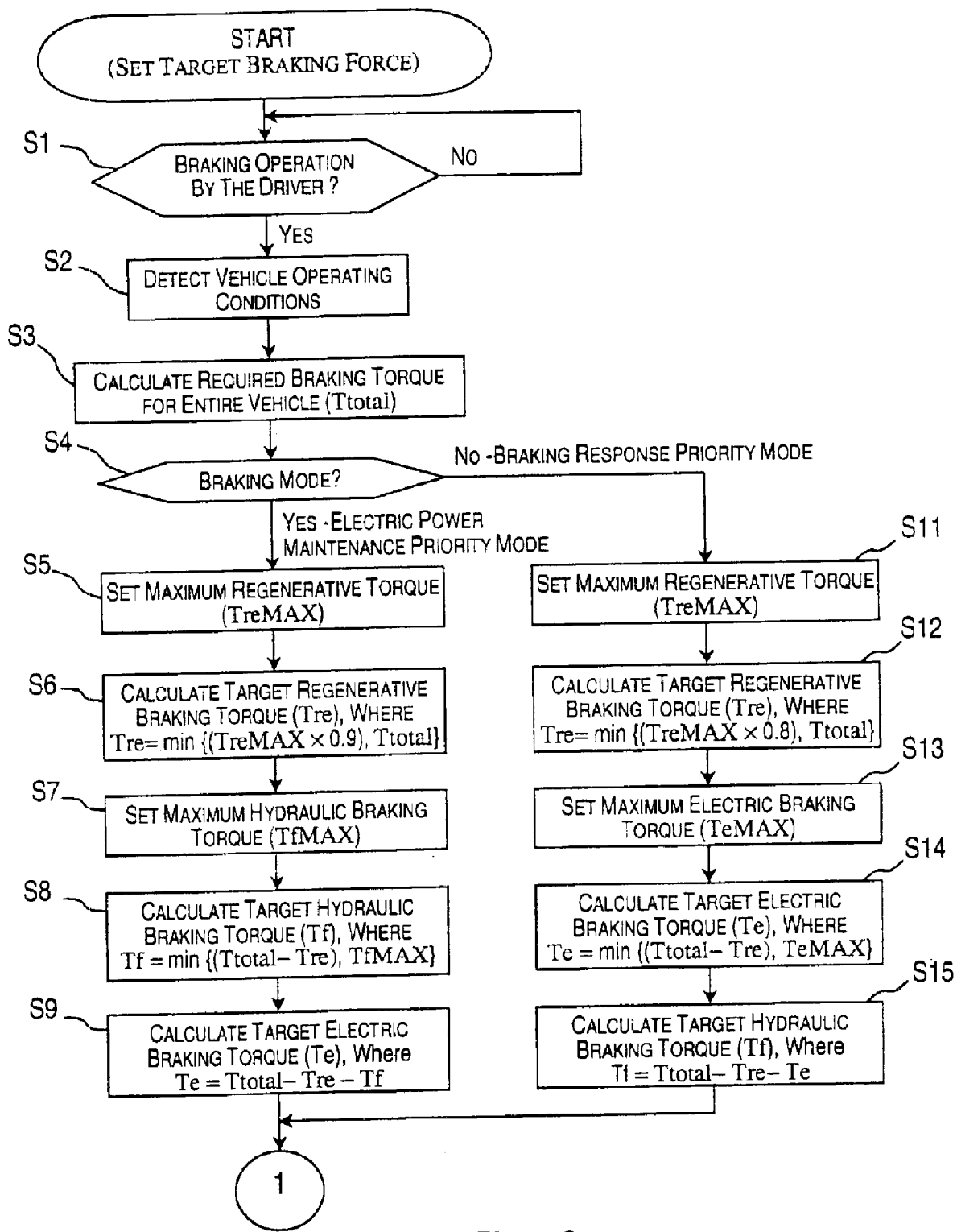
FIG. 2 is a flowchart of a first half of a calculation program for determining the target regenerative braking force, the target hydraulic braking force, and the target electric braking force executed by the brake controller in the vehicle braking control system in accordance with the present invention.
Figure 3:
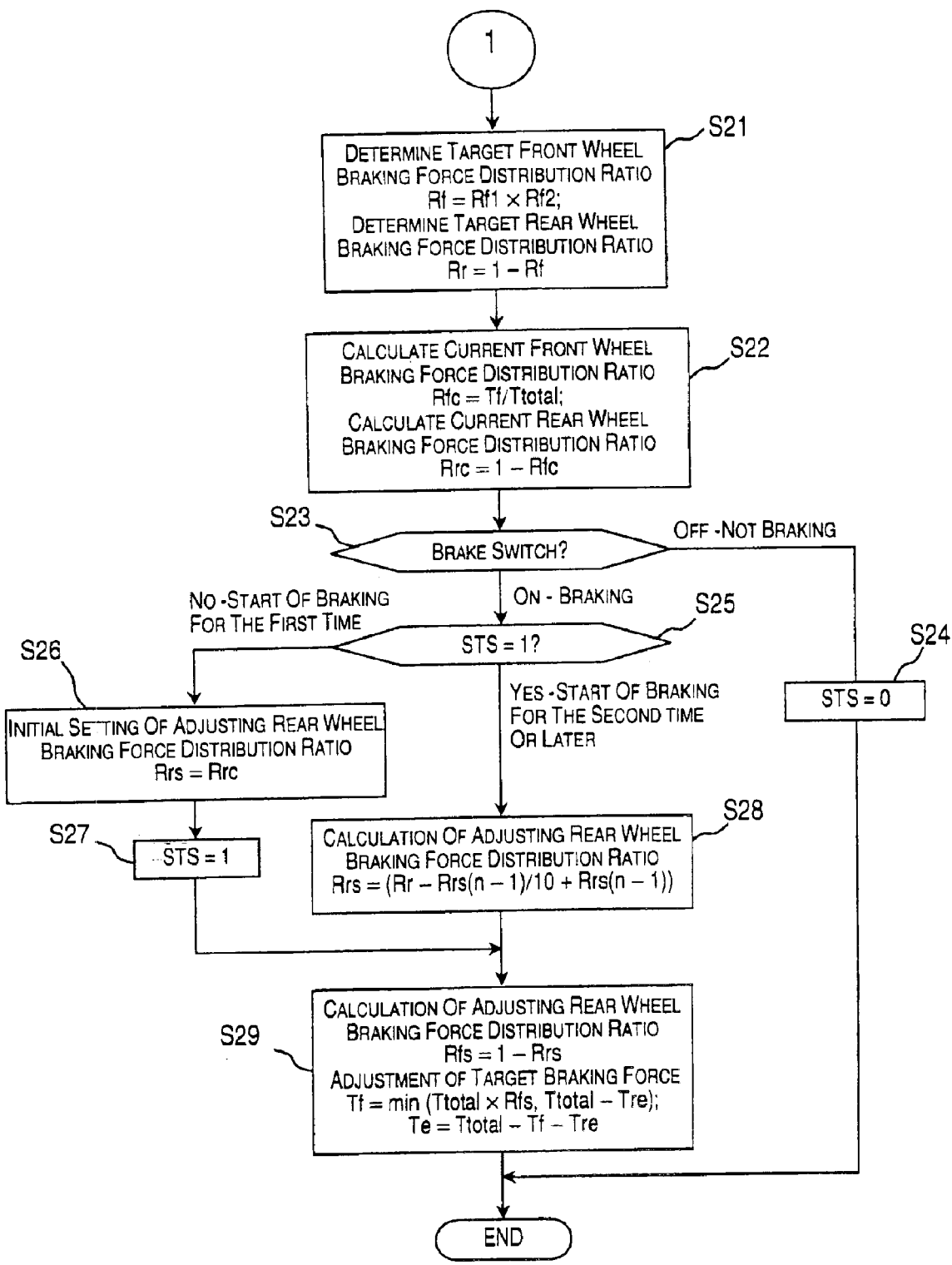
FIG. 3 is a flowchart of a second half of the calculation program for determining the target braking force executed by the brake controller in the vehicle braking control system in accordance with the present invention.

The brake controller 11 executes a control program shown in FIGS. 2 and 3 on the basis of the above-stated input information; the target regenerative braking force (torque) produced by the regenerative braking device, the target hydraulic braking force (torque) produced by the hydraulic braking device, and the electric braking force (torque)

produced by the electric braking device are determined; and from these the required braking force for the entire vehicle is obtained. The brake controller 11 preferably includes a microcomputer with a brake control program that controls the braking devices as discussed below. The brake controller 11 can also include other conventional components such as an input interface circuit, an output interface circuit, and storage devices such as a ROM (Read Only Memory) device and a RAM (Random Access Memory) device. The microcomputer of the brake controller 11 is programmed to control each of the braking devices. The brake controller 11 is operatively coupled to each of the braking devices in a conventional manner. It will be apparent to those skilled in the art from this disclosure that the precise structure and algorithms for the brake controller 11 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

First, in step S1 of FIG. 2, a determination is made by the brake controller 11 based on the signal from the stroke sensor 14 and on the generated pressure of the master cylinder 13 as to whether the driver has performed a braking operation. The determination of step S1 is repeatedly made by the brake controller 11 until a braking operation is performed.

When the determination is made by the brake controller 11 that a braking operation was performed in step S1, the following vehicle operating conditions are detected in step S2: a current vehicle speed, a current rotational speed of the alternating synchronous motors 9L and 9R, a current braking torque produced by the regenerative braking device comprising these electric motors, a current brake hydraulic pressure provided to the hydraulic pressure caliper brakes 5L and 5R that constitute the hydraulic braking device, and a current braking torque produced by the electric braking device comprising the electric caliper brakes 7L and 7R.

In the subsequent step S3, the vehicle target amount of speed reduction is determined by the brake controller 11 from the above-described vehicle operating conditions. Thus, the required braking torque Ttotal for the entire vehicle is calculated on the basis of this determination. The target amount of speed reduction is set based on a predetermined map that correlates the amount of operation of the brake pedal BP, the master cylinder pressure from the master cylinder 13 and the vehicle speed.

The required braking torque Ttotal for the entire vehicle is expressed by the following formula from the rotational motion equation of the wheels, where α is the target amount of speed reduction of the vehicle, W is the vehicle mass, R is the dynamic tire radius, I is the tire inertia of the four wheels, and ω is the angular velocity of the tires.

$$Ttotal = \alpha \times W \times R \times I \times d\omega$$

$$Ttotal = \alpha \times W \times R \times I \times \alpha/R$$

$$Ttotal = (W \times R^2 + I) \times \alpha/R$$

In step S4, the brake controller 11 determines whether the braking mode selected by the braking mode selection switch 15 is set to the electric power maintenance priority mode or to the braking response priority mode. Thus, the process of step S4 and the braking mode selection switch 15 function as a braking mode selecting section of the brake controller 11. This braking mode selecting section is configured to set one of a plurality of braking modes as a selected braking mode. Each of the braking modes has a different braking control priority for a target regenerative braking force, a target hydraulic braking force and a target electric braking force. In other words, each of the braking modes has different preferences for setting the braking forces of each braking system or device.

Figure 6:
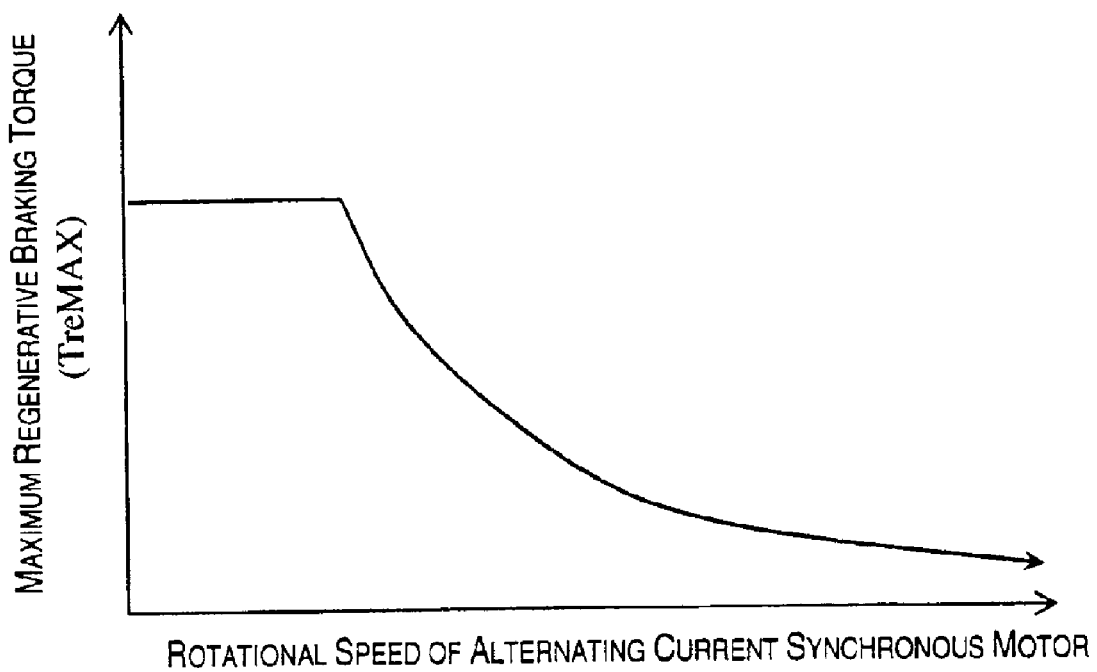
FIG. 6 is a graph depicting the variation characteristics of the maximum regenerative braking torque that can be generated by the regenerative braking device.

In the case where the electric power maintenance priority mode is selected, the maximum regenerative braking torque TreMAX is first set in step S5 from the rotational speed of the electric motor on the basis of the operating characteristics map of the alternating synchronous motors 9L and 9R illustrated in FIG. 6.

The target regenerative braking torque Tre is then determined in the following step S6. At this point, the smaller value is selected from among (TreMAX×0.9), which is less than the maximum regenerative braking torque TreMAX by the margin for setting the degree of freedom, and the required braking torque Ttotal for the entire vehicle, i.e., min {(TreMAX×0.9), Ttotal}. This selected value is then set to the target regenerative braking torque Tre in order to make maximal use of the maximum regenerative braking torque TreMAX in response to the vehicle braking system being set to the electric power maintenance priority mode. In other words, when the electric power maintenance priority mode is selected the target regenerative braking torque Tre is set to substantially maximize the regenerative braking torque that can be generated. The term "substantially" as used herein to modify "maximize" recognizes that an absolute maximum may be difficult or impractical to obtain. Thus, the "substantially maximize" includes a value that is slightly less than the absolute maximum, but still carries out the essence of the present invention.

Figure 7:
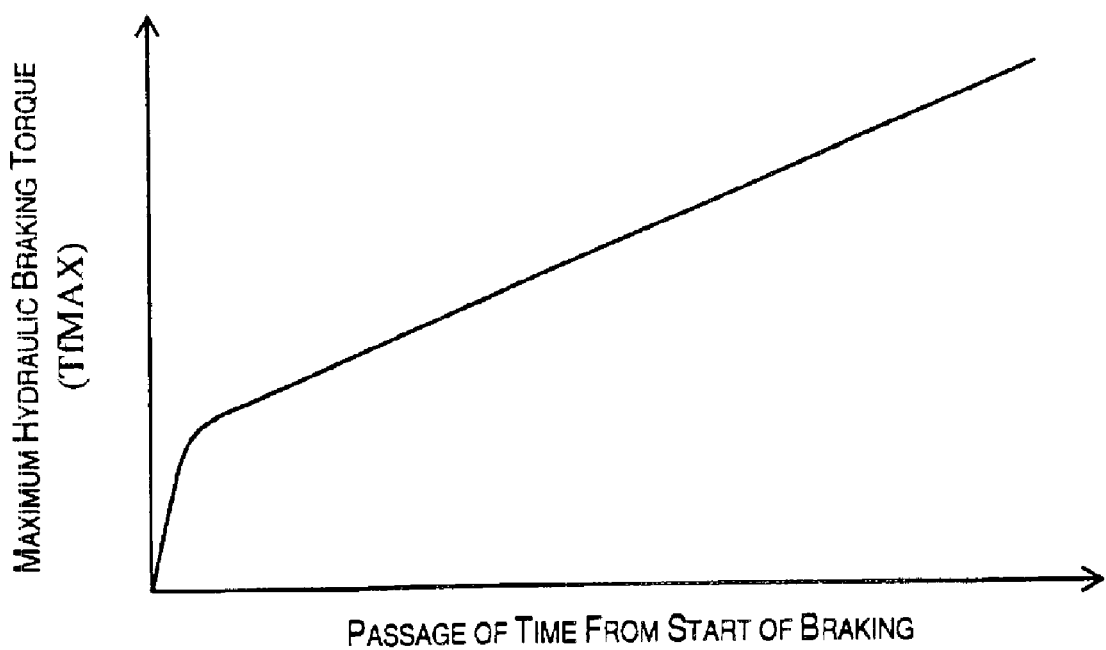
FIG. 7 is a graph depicting the variation characteristics of the maximum hydraulic braking torque that can be generated by the hydraulic braking device following a response delay.

Since the vehicle braking system is in the electric power maintenance priority mode, the maximum hydraulic braking torque TfMAX exerted by the hydraulic braking device is subsequently set in step S7 depending on the amount of time that has elapsed from the start of braking, and based on the operating response characteristics of the hydraulic braking device determined in advance as illustrated in FIG. 7.

Next, the brake controller 11 determines the target hydraulic braking torque Tf in the following step S8. At this point, the smaller value is selected from among the maximum hydraulic braking torque TfMAX and the braking force deficiency (Ttotal−Tre) obtained by subtracting the target regenerative braking torque Tre from the required braking torque (Ttotal) for the entire vehicle, i.e., min {(Ttotal−Tre), TfMAX}. This value is then set to the target hydraulic braking torque Tf in order to make maximal use of the maximum hydraulic braking torque TfMAX in response to the system being in electric power maintenance priority mode. In other words, when the electric power maintenance priority mode is selected the target hydraulic braking torque Tf is set to substantially maximize the hydraulic braking torque that can be produced taking in to account the required braking torque (Ttotal) for the entire vehicle and based on the operating response characteristics of the hydraulic braking device.

The target electric braking torque Te is determined by the brake controller 11 in the last step S9. The braking force (Ttotal−Tre−Tf) obtained by subtracting the target hydraulic braking torque Tf from the difference (Ttotal−Tre) between the required braking torque Ttotal and the target regenerative braking torque Tre is set as the target electric braking torque Te.

When a determination is made by the brake controller 11 in step S4 that the braking mode selected by the braking mode selection switch 15 is the braking response priority mode, then the processing proceeds to step S11. In step S11, the maximum regenerative braking torque TreMAX is set from the rotational speed of the electric motor on the basis of the operating characteristics map of the alternating synchronous motors 9L and 9R illustrated in FIG. 6.

The target regenerative braking torque Tre is determined by the brake controller 11 in the following step S12. At this point, the smaller value of min {(TreMAX×0.8), Ttotal} is selected from among (TreMAX×0.8), which is less than the maximum regenerative braking torque TreMAX by the margin for setting the degree of freedom, and the required braking torque Ttotal for the entire vehicle. This value is set to the target regenerative braking torque Tre in order to make maximal use of the maximum regenerative braking torque TreMAX in response to the vehicle braking system being in braking response priority mode.

Next, in step S13, the vehicle braking system is in the braking response priority mode, so the maximum electric braking torque TeMAX is set by the electric braking device on the basis of the operating response characteristics (not depicted) of the electric caliper brakes 7L and 7R determined in advance.

The target electric braking torque Te is determined by the brake controller 11 in the following step S14. At this point, the smaller value of min {(Ttotal−Tre), TeMAX} is selected from among the maximum electric braking torque TeMAX and the braking force deficiency (Ttotal−Tre) obtained by subtracting the target regenerative braking torque Tre from the required braking torque (Ttotal) for the entire vehicle. This value is set to the target electric braking torque Te in order to make maximal use of the maximum electric braking torque TeMAX in response to the system being in braking response priority mode. In other words, when the braking response priority mode is selected the target electric braking torque Te is set to substantially maximize the electric braking torque that can be produced taking in to account the required braking torque (Ttotal) for the entire vehicle and based on the operating response characteristics of the electric braking device.

The target hydraulic braking torque Tf is determined by the brake controller 11 in the last step S15. At this time, the braking force (Ttotal−Tre−Te) obtained by subtracting the target electric braking torque Te from the difference (Ttotal−Tre) between the required braking torque Ttotal and the target regenerative braking torque Tre, is set as the target hydraulic braking torque Tf.

According to the embodiment described above, the required braking force for the entire vehicle can be ensured by first determining the target regenerative braking force Tre produced by the regenerative braking device, then determining the target hydraulic braking force Tf produced by the hydraulic braking device, and thereafter determining the target electric braking force Te produced by the electric braking device. In other words, in an order of precedence in which the braking control form that is required at that point if the system is in the electric power maintenance priority mode, so as to ensure a required braking force for the entire vehicle.

Moreover, according to the embodiment described above, the required braking force for the entire vehicle can be ensured by first determining the target regenerative braking force Tre produced by the regenerative braking device, then determining the target electric braking force Te produced by the electric braking device, and thereafter determining the target hydraulic braking force produced by the hydraulic braking device, In other words, an order of precedence in which the braking control form that is required at that point if the system is in the braking response priority mode, so as to ensure a required braking force for the entire vehicle.

Thus, the vehicle braking control system makes it possible to ensure the required braking force for the entire vehicle while satisfying the braking control form required for each selected braking mode, and to obtain a vehicle braking device with excellent control response characteristics in relation to the requirements of each braking mode.

Sequentially determining the target regenerative braking force Tre, the target hydraulic braking force Tf, and the target electric braking force Te in the electric power maintenance priority mode entails determining the target regenerative braking force Tre in a manner that makes maximal use of the maximum regenerative braking force that the regenerative braking device can generate, determining the target hydraulic braking force Tf in a manner that makes maximal use of the maximum hydraulic braking force that the hydraulic braking device can generate, and setting the target electric braking force Te to compensate for the deficiency that results from the inability of the target regenerative braking force Tre and the target hydraulic braking force Tf to ensure the required braking force Ttotal for the entire vehicle. Thus making it possible to minimize the consumption of electric power while ensuring the most effective utilization of the kinetic energy of the vehicle, and to perform braking while maintaining the electric power of the battery 12 required in the electric power maintenance priority mode.

Sequentially determining the target regenerative braking force Tre, the target electric braking force Te, and the target hydraulic braking force Tf in the braking response priority mode entails determining the target regenerative braking force Tre in a manner that makes maximal use of the maximum regenerative braking force that the regenerative braking device can generate, determining the target electric braking force Te in a manner that makes maximal use of the maximum electric braking force that the electric braking device can generate, and setting the target hydraulic braking force Tf so as to compensate for the deficiency that results from the inability of the target regenerative braking force Tre and the target electric power Te braking force to ensure the required braking force Ttotal for the entire vehicle. Thus, the vehicle braking control system makes it possible to perform braking while minimizing the generated response from the brake pedal operation required in the braking response priority mode, and while ensuring the most effective utilization of the kinetic energy of the vehicle.

As described above, determining the target electric braking force Te last in the electric power maintenance priority mode entails setting the braking force so as to compensate for the deficiency that results from the inability of the target regenerative braking force Tre and the target hydraulic braking force Tf to ensure the required braking force Ttotal for the entire vehicle, and determining the target hydraulic braking force Tf last in the braking response priority mode entails setting the braking force so as to compensate for the deficiency that results from the inability of the target regenerative braking force Tre and the target electric power Te braking force to ensure the required braking force Ttotal for the entire vehicle.

Turning now to FIG. 3, the braking force distribution among the wheels of the vehicle is taken into consideration at this point. Specifically, the weight on the front wheels 3L and 3R increases due to vehicle nose-dive or the like during braking, and the weight on the rear wheels decreases proportionally. Thus, the coefficient of tire friction of the rear wheels 4L and 4R is reduced.

If the distribution of braking force to the front and rear wheels is the same in spite of this, then the rear wheels 4L and 4R tend to lock earlier than the front wheels 3L and 3R causing the vehicle to spin or otherwise behave in an unstable manner. Thus, it is necessary to set the distribution of braking force of the front and rear wheels so that the braking force of the rear wheels 4L and 4R is smaller than the braking force of the front wheels 3L and 3R.

In addition to the distribution of the braking force to the front and rear wheels, the braking force distribution must be controlled between the left and right wheels and between diagonally opposing wheels so that the yaw rate and other turning behavior attributes of the vehicle correspond to steering operations.

However, the target braking forces Tre, Tf, and Te determined in the manner described above with reference to FIG. 2 do not necessarily correspond to the target distribution of braking force between the wheels that needs to be established in response to the vehicle braking condition described above, and any of the target braking forces Tre, Tf, and Te must be adjusted so that the desired target distribution of braking force between the wheels is ensured.

This adjustment is performed as described below by the control program in FIG. 3, which starts after the control program in FIG. 2 has ended at (1).

FIG. 3 is a control program for adjusting the target electric braking force Te and the target hydraulic braking force Tf so that a target front and rear wheel braking force distribution ratio is ensured in order to prevent the rear wheels from locking during braking, as described above.

Figures 8, 9:
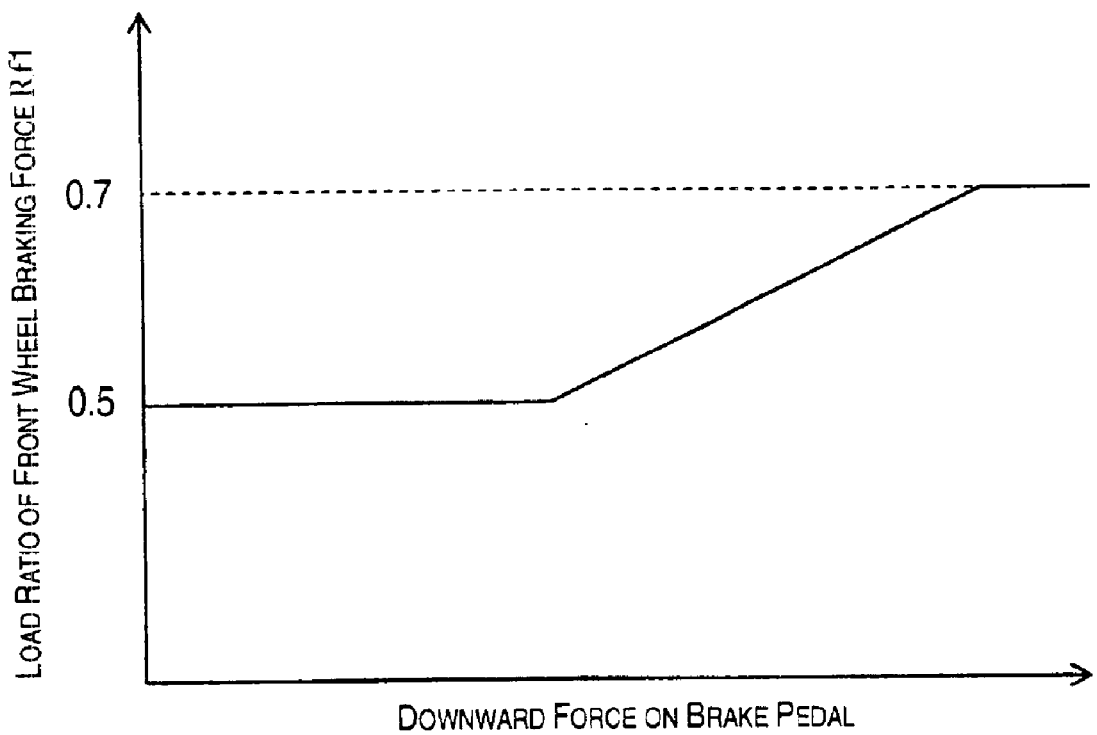
FIG. 8 is a graph depicting the variation characteristics of the load ratio of the front wheel braking force to the downward force on the brake pedal.
FIG. 9 is a graph depicting the variation characteristics of the load ratio of the front wheel braking force to the yaw rate.

First, the target front and rear wheel braking force distribution ratios Rf and Rr are determined by the brake controller 11 in step S21. The computation of the target front and rear wheel braking force distribution ratio Rf entails looking up the front wheel braking force load percentages Rf1 and Rf2 in view of the downward force on the brake pedal and the yaw rate, respectively. For example, the front wheel braking force load percentage Rf1 is determined using a predetermined map that relates the front wheel braking force load percentage Rf1 to the downward force on the brake pedal illustrated in FIG. 8, and the front wheel braking force load percentage Rf2 is determined using is determined using a predetermined map that relates the front wheel braking force load percentage Rf2 to the vehicle yaw rate illustrated in FIG. 9. The target front wheel braking force load ratio Rf is then determined by multiplying the front wheel braking force load percentages Rf1 and Rf2.

The target rear wheel braking force distribution ratio Rr can naturally be determined using the equation Rr=1−Rf.

In step S22, the ratio of the front wheel braking force (target hydraulic braking force Tf, in the present example) in relation to the above-noted required braking force Ttotal of the entire vehicle is also determined by the brake controller 11. In other words, the current distribution ratio of the front wheel braking force Rfc=Tf/Ttotal is determined by the brake controller 11 and the current distribution ratio of the rear wheel braking force Rrc=1−Rfc is also determined by the brake controller 11.

In the following step S23, the brake controller 11 determines whether the brake switch is ON or whether the switch is OFF. In other words, the brake controller 11 determines whether the brakes are being operated, or not being operated.

If the brakes are not being operated, then a flag STS is set to 0 in step 24. This flag STS indicates whether a processing has started (whether it is the second or later cycle from the start of braking) in which the target electric braking force Te and the target hydraulic braking force Tf are adjusted in the direction from the current front and rear wheel braking force distribution ratios Rfc and Rrc at the start of braking toward the target front and rear wheel braking force distribution ratios Rf and Rr. When the flag STS is set to zero (flag STS=0), this indicates that this processing has not yet started (it is not the second or later cycle from the start of braking).

In the case where a determination is made by the brake controller 11 that the brakes are being operated in step S23, then the brake controller 11 determines whether the flag STS is set to 1 in step S25.

Because the flag STS is equal to zero immediately after the start of braking, control proceeds to step S26, the rear wheel braking force distribution ratio Rrc that existed at the start of braking and was determined in step S22 is set at this point to the adjusting rear wheel braking force distribution ratio Rrs to ensure the above-stated adjustment, and the adjusting rear wheel braking force distribution ratio Rrs is initialized.

In the following step S27, the flag STS is set to 1 so as to indicate that the above-stated adjustment has started.

As a result, steps S26 and S27 are executed only once immediately after the start of braking, and control thereafter advances from step S25 to step S28.

In step S28, the current adjusting rear wheel braking force distribution ratio Rrs is determined by computing Rrs=Rr−Rrs(n−1)/10+Rrs(n−1) so that the adjusting rear wheel braking force distribution ratio Rrs asymptotically changes from the initial set value Rrc (step S26) to the target rear wheel braking force distribution ratio Rr (step S21).

In this equation, the term Rrs(n−1) indicates the previous computation value of the adjusting rear wheel braking force distribution ratio Rrs.

In step S29, the adjusting front wheel braking force distribution ratio Rfs is determined by the equation Rfs=1−Rrs from the adjusting rear wheel braking force distribution ratio Rrs determined in step S26 or S28. Also, in step S29, the target electric braking force Te (a portion of the rear wheel braking force) and the target hydraulic braking force Tf (front wheel braking force) are adjusted in the direction from the current front and rear wheel braking force distribution ratios Rfc and Rrc at the start of braking toward the target front and rear wheel braking force distribution ratios Rf and Rr, as described below.

First, the smaller value is selected as the front wheel target braking force (target hydraulic braking force Tf) from among the braking force deficiency obtained by subtracting the target regenerative braking torque Tre from the required braking torque (Ttotal) for the entire vehicle, and the multiplication product of the required braking torque (Ttotal) for the entire vehicle and the adjusting front wheel braking force distribution ratio Rfs, i.e., min {(Ttotal×Rfs), (Ttotal−Tre)}. The target electric braking force Te, which is a portion of the rear wheel target braking force, is calculated using the equation Te=Ttotal−Tf−Tre. In other words, the target electric braking force Te is calculated based on the front wheel target braking force (target hydraulic braking force Tf), the required braking force Ttotal for the entire vehicle, and the target regenerative braking force Tre determined in the manner described above. The target electric braking force Te (a portion of the rear wheel braking force) and the target hydraulic braking force Tf (front wheel braking force) are adjusted in the direction from the front and rear wheel braking force distribution ratios Rfc and Rrc at the start of braking toward the target front and rear wheel braking force distribution ratios Rf and Rr.

By adjusting the target electric braking force Te (a portion of the rear wheel braking force) and the target hydraulic braking force Tf (front wheel braking force), it is possible to allow the front and rear wheel braking force distribution ratios at the start of braking to asymptotically approach the target front and rear wheel braking force distribution ratios Rf and Rr (step S21). Thus, unnecessary changes in vehicle behavior and shock to be avoided. Moreover, by smoothing the change in the electric braking force Te (a portion of the rear wheel braking force), it is possible to minimize the electric power consumed by the electric braking device.

Figure 4:
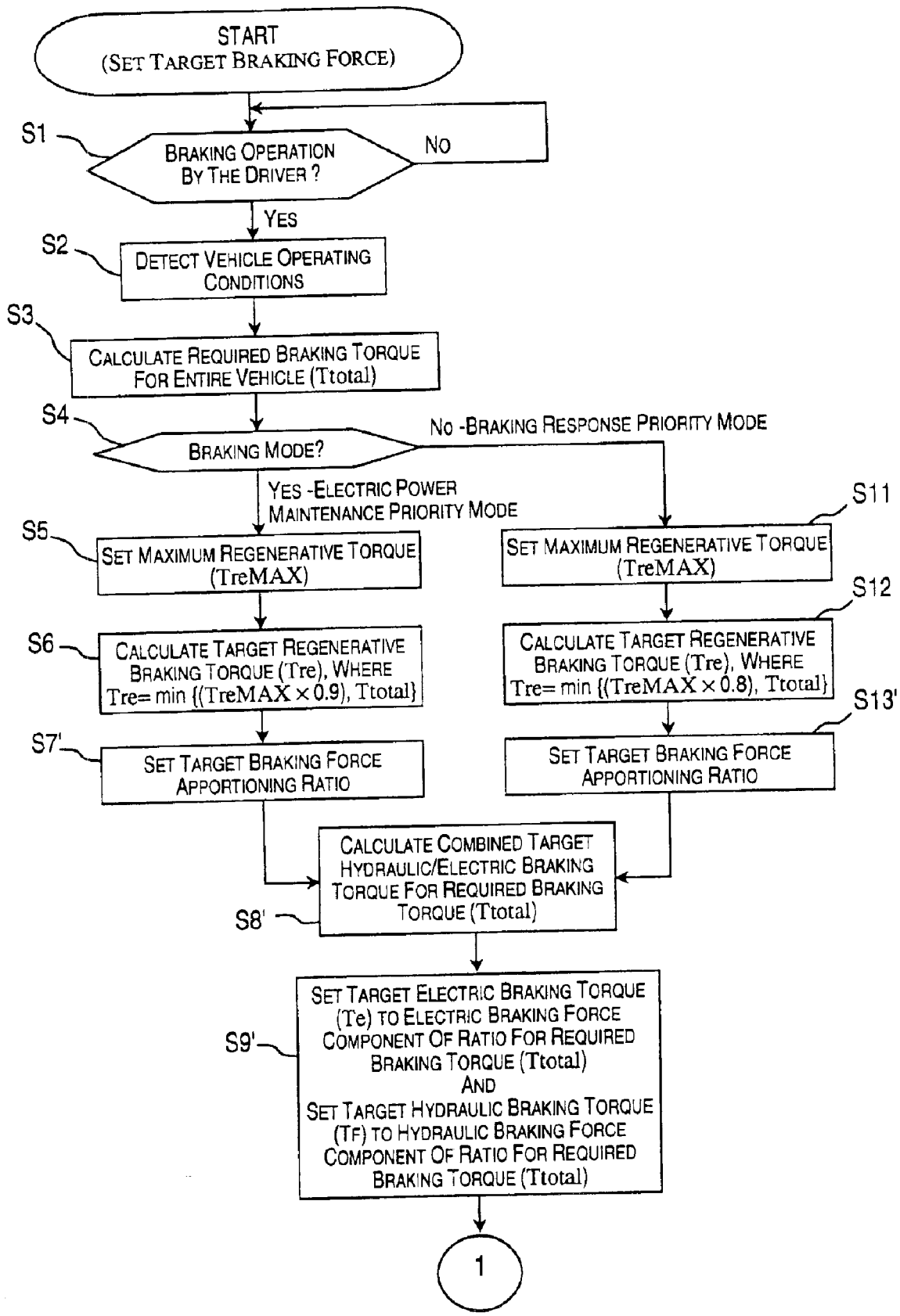
FIG. 4 is a flowchart of an alternate calculation program for determining the target regenerative braking force, the target hydraulic braking force, and the target electric braking force executed by the brake controller in the vehicle braking control system in accordance with the present invention.

Alternatively, as seen in FIG. 4, the target braking force setting section of the brake controller 11 is configured to set the target hydraulic braking force Tf and the target electric braking force Te using a target braking force apportioning ratio having a hydraulic braking force component and an electric braking force component after the target regenerative braking force Tre to a value that substantially maximizes a regenerative braking force that can be generated. This alternative method of setting the target hydraulic braking force Tf and the target electric braking force Te is used in both the electric power maintenance priority mode and the braking response priority mode. However, the target braking force apportioning ratios are preferably different between the electric power maintenance priority mode and the braking response priority mode. Moreover, several different target braking force apportioning ratios can be preset for each of the priority modes to optimize braking based on various operating conditions.

As seen in FIG. 4, the same processing is performed as in the steps indicated by the same symbols in FIG. 2. Thus, the processing in steps S1 to S6 and steps S11 and S12 are executed in the same manner as discussed above with reference to FIG. 2. In step S6 or step S12, depending on the braking mode determined in step S4, the target braking force setting section of the brake controller 11 sets the target regenerative braking force Tre to a value that substantially maximizes a regenerative braking force that can be generated. Then, the target braking force setting section of the brake controller 11 sets the target braking force apportioning ratio for the current operating conditions in step S7' or S13'. In step 8', the target braking force setting section of the brake controller 11 sets a difference between the required braking force Ttotal for the entire vehicle and the target regenerative braking force Tre as a combined target hydraulic/electric braking force to be apportioned between the target hydraulic braking force Tf and the target electric braking force Te. Accordingly, using the target braking force apportioning ratio, the target braking force setting section of the brake controller 11 now sets the target hydraulic braking force Tf and the target electric braking force Te (step S9'). In other words, the target braking force setting section of the brake controller 11 sets the target hydraulic braking force Tf and the target electric braking force Te by apportioning the combined target hydraulic/electric braking force between the target hydraulic braking force Tf and the target electric braking force Te based on the target braking force apportioning ratio. The processing by the brake controller 11 then preferably the processing by the brake controller 11 proceeds to the adjustment program of FIG. 3, as discussed above.

For example, as in the first embodiment of the present invention, where the hydraulic brakes 5L and 5R are coupled to the front wheels 3L and 3R and both the electric brakes 7L and 7R and the alternating synchronous motors or regenerative brakes 9L and 9R are coupled to the rear wheels 4L and 4R, a prescribed target apportion ratio between the hydraulic brakes 5L and 5R and the electric brakes 7L and 7R is set such that the braking force of the hydraulic brakes 5L and 5R of the front wheels 3L and 3R is greater than the braking force the electric brakes 7L and 7R of the rear wheels 7L and 7R. For example, the prescribed target apportion ratio of the hydraulic brakes to the electric brakes is 2 to 1. The reason why is that, since the load on the front wheels 3L and 3R generally increase and the load on the rear wheels 4L and 4R decrease when braking, the braking force should be apportioned such that the front wheels 3L and 3R have more braking force. For example, suppose the requested (total) braking force Ttotal is 100N and a regenerative TreMAX is 10N, then a braking force of 90N is apportioned between the hydraulic brakes 5L and 5R and the electric brakes 7L and 7R. In the case where the prescribed target apportion ratio of the hydraulic brakes to the electric brakes is 2 to 1, the hydraulic braking force component is 60N and the electric braking force component is 30N. Thus, the total braking force on the rear wheels 4L and 4R is 40N (regenerative plus electric), while the braking force on front wheels 3L and 3R is 60N. However, this prescribed target apportion ratio may not precisely match the characteristic line of so called the ideal front-rear braking force apportion ratio in which the front and rear wheels are locked at the same time. Therefore, the ideal ratio is not realized in order to prioritize the preservation of the electricity.

Also, on a road with a low road surface coefficient of friction $\mu$, the wheels tend to lock even with a small braking force, but usually, the small offset from the ideal apportion force, in this alternative embodiment does not affect in this level of locking.

As briefly mentioned above, locking of the front and rear wheels at the same time is ideal to prevent the vehicle from spinning or otherwise behaving in an unstable manner. In other words, if the rear wheels are locked prior to the locking of the front wheels 3L and 3R, the rear wheels 4L and 4R will slip sideways and the vehicle will spin (over steer). If the front wheels 3L and 3R are locked prior to the locking of the rear wheels 4L and 4R, the front wheels 3L and 3R will slip sideways and the vehicle advance forward even when the steering wheel is turned (under steer).

In this alternative embodiment, the target hydraulic braking force Tf and the target electric braking force Te are adjusted in relation to the values that were determined as described above in the electric power maintenance priority mode and the braking response priority mode to ensure a predetermined braking force apportioning ratio between the hydraulic and electric braking systems described above.

Figure 5:
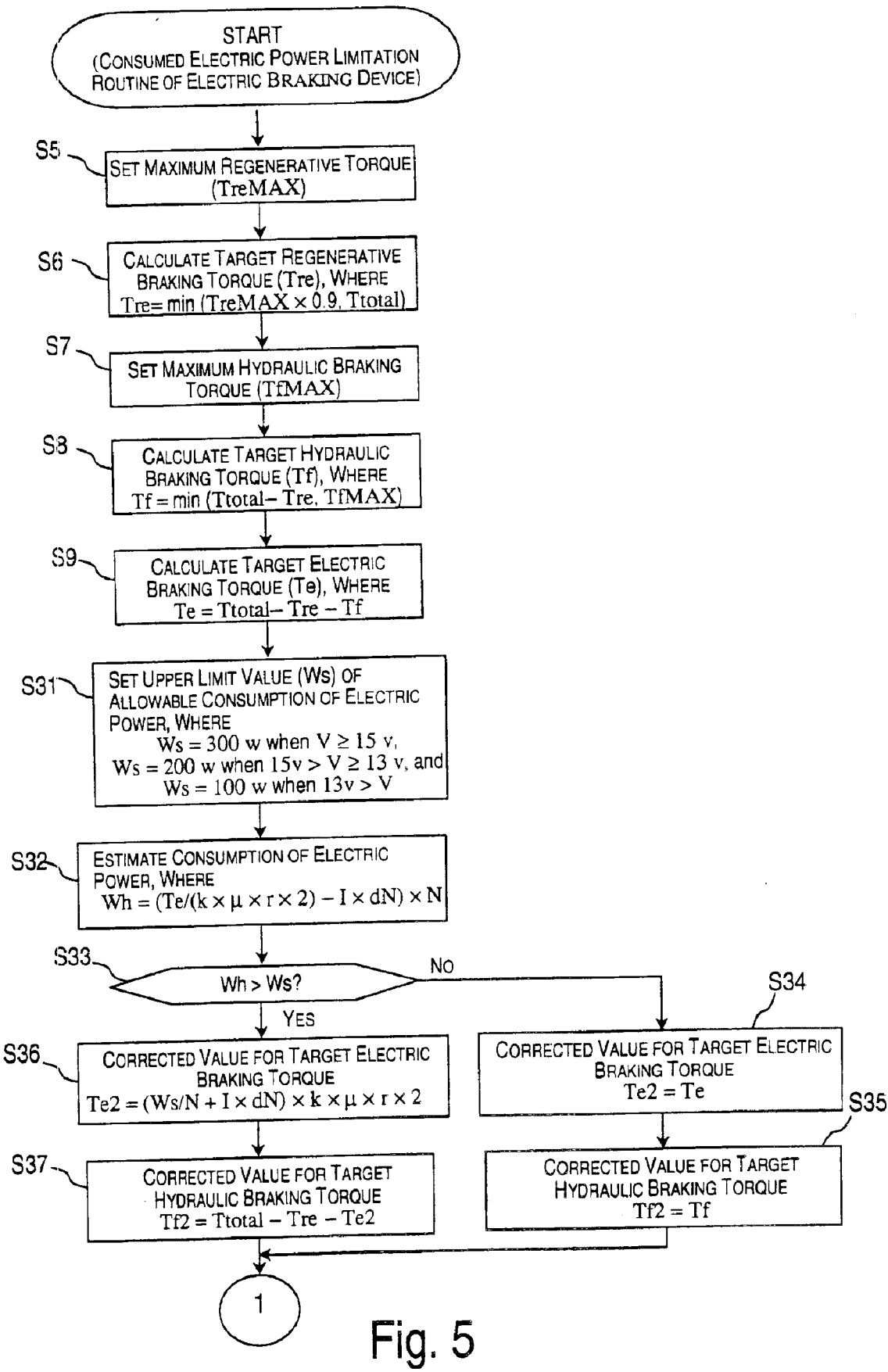
FIG. 5 is a flowchart of a program related to the consumed electric power limitation routine of the electric braking device executed by the brake controller in the vehicle braking control system in accordance with the present invention.

FIG. 5 shows another embodiment of the processing in steps S5 to S9, which are executed when it is determined in step S4 of FIG. 2 that the electric power maintenance priority mode is selected. In the present embodiment, the electric power consumed by the electric braking device is prevented from increasing beyond the limited range in view of the requirements of the electric power maintenance priority mode.

In steps S5 to S9, the same processing is performed as in the steps indicated by the same symbols in FIG. 2, and calculation is performed to determine the target regenerative braking torque Tre, the target hydraulic braking torque Tf, and the target electric braking torque Te.

The upper limit value Ws of allowable consumption of electric power is set in step S31. This setting action entails, for example, stipulating that Ws=300 W when the battery voltage V is 15 V or more, that Ws=200 W when the battery voltage V is 13 V or more and less than 15V, and that Ws=100 W when the battery voltage V is less than 13 V.

In the following step S32, the electric power Wh consumed by the electric braking device is calculated and estimated using the following equation:

$$Wh=\{Te/(k \times \mu \times r \times 2)-I \times dN\} \times N,$$

where the term Te is the target electric braking torque, the term k is the coefficient for converting the torque of the electric motor in the electric caliper brakes into thrust, the term $\mu$ is the coefficient of friction of the brake pads, the term r is the effective radius of the brake rotor, the term I is the equivalent value of the moment of inertia, the term N is the rotational speed of the electric motor, and the term dN is the derivative value thereof.

In step S33, a comparison is drawn between the consumed electric power Wh of the electric braking device and the upper limit value Ws of allowable consumption of electric power. If the consumed electric power Wh is equal to or less than the upper limit value Ws of allowable consumption of electric power, then the corrected value Te2 for the target electric braking torque is set to the same value as the target electric braking torque Te (step S9) in step S34. Moreover, the target electric braking torque Te is essentially not corrected, the corrected value Tf2 for the target hydraulic braking torque is set to the same value as the target hydraulic braking torque Tf (step S8) in step S35, and the target hydraulic braking torque Tf is essentially not corrected.

When it is determined that the consumed electric power Wh exceeds the upper limit value Ws of allowable consumption of electric power in step S33, the corrected value Te2 for the target electric braking torque is calculated in step S36 using the following equation:

$$Te2=(Ws/N+I \times dN) \times k \times \mu \times r \times 2.$$

Moreover, the corrected value Te2 for the target electric braking torque is determined so that the consumed electric power Wh remains within a range that does not exceed the upper limit value Ws of allowable consumption of electric power. By using this in lieu of the target electric braking torque Te in step S9, the target electric braking torque is adjusted such that the consumed electric power Wh of the electric braking device remains within a limited range (i.e., within a range which does not exceed the upper limit value Ws of allowable consumption of electric power).

In the following step S37, in order to compensate for the fact that the required braking power Ttotal for the entire vehicle has not been achieved with this adjustment, the corrected value Tf2 for the target hydraulic braking torque is determined by computing Tf2=Ttotal−Tre−Te2, and the target hydraulic braking torque is adjusted so that the required braking power Ttotal for the entire vehicle is ensured.

Thus, the braking force control can be even further harmonized in the electric power maintenance priority mode by adjusting the target electric braking torque so that the consumed electric power Wh remains within a limited range (i.e., within a range which does not exceed the upper limit value Ws of allowable consumption of electric power).

When the consumed electric power of the electric braking device is determined according to the computation described above, the above-described effects can be further enhanced by determining the consumed electric power with consideration given to the power supply voltage and the consumed current of the electric braking device, or to the drive command of the electric braking device, or to the operating speed and operating force of the electric braking device, to achieve more accurate results.

The upper limit value Ws of allowable consumption of electric power is set in accordance with solely the battery voltage (in a charged state), but the value may be increased as the quantity of charge provided to the battery is increased, or as the electric power drawn from the battery is decreased.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-357721. The entire disclosure of Japanese Patent Application No. 2002-357721 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle braking control system comprising:
   a braking mode selecting section configured to set one of a plurality of braking modes as a selected braking mode, with each of the braking modes having a different braking control priority with a different sequence for setting a target regenerative braking force, a target hydraulic braking force and a target electric braking force;
   a required braking force determining section configured to determine a required braking force for an entire vehicle; and
   a target braking force setting section configured to set the target regenerative braking force, the target hydraulic braking force, and the target electric braking force based on the braking control priority of the selected braking mode to produce the required braking force for the entire vehicle.

2. The vehicle braking control system according to claim 1, wherein
   the braking mode selecting section is further configured to include a braking response priority mode as one of braking modes.

3. The vehicle braking control system according to claim 2, wherein
   the target braking force setting section is further configured to first set the target regenerative braking force to be produced, second set the target electric braking force to be produced based on the target regenerative braking force previously set and the required braking force for the entire vehicle, and third set the target hydraulic braking force to be produced based on the target regenerative braking force and target electric braking force that were the previously set and the required braking force for the entire vehicle, such that the required braking force for the entire vehicle is produced, when the braking response priority mode is selected.

4. The vehicle braking control system according to claim 3, wherein the target braking force setting section is further configured to set the target regenerative braking force and the target electric braking force to values that substantially maximize a regenerative braking force that can be generated; and the target braking force setting section is further configured to set the target hydraulic braking force as a difference between the required braking force for the entire vehicle and a sum of the target regenerative braking force and the target electric braking force.

5. The vehicle braking control system according to claim 3, wherein the target braking force setting section is further configured to set a target braking force apportioning ratio having a hydraulic braking force component and an electric braking force component;

the target braking force setting section is further configured to set the target regenerative braking force to a value that substantially maximizes a regenerative braking force that can be generated;

the target braking force setting section is further configured to set a difference between the required braking force for the entire vehicle and the target regenerative braking force as a combined target hydraulic/electric braking force; and the target braking force setting section is further configured to set the target hydraulic braking force and the target electric braking force by apportioning the combined target hydraulic/electric braking force between the target hydraulic braking force and the target electric braking force based on the target braking force apportioning ratio.

6. The vehicle braking control system according to claim 3, wherein the target braking force setting section is further configured to determine the target regenerative braking force to substantially maximize a regenerative braking force that can be generated;

the target braking force setting section is further configured to determine the target electric braking force to substantially maximize an electric braking force that can be produced in view of the target regenerative braking force that was previously set and the required braking force for the entire vehicle; and the target braking force setting section is further configured to set the target hydraulic braking force as a difference between the required braking force for the entire vehicle and a sum of the target regenerative braking force and the target electric braking force.

7. The vehicle braking control system according to claim 3, further comprising a braking force distribution ratio determining section configured to determine a braking force distribution ratio among a set of wheels at a start of braking from the target regenerative braking force, the target hydraulic braking force, and the target electric braking force;

the braking force distribution ratio determining section being further configured to determine the target braking force distribution ratio among the wheels from at least one operating condition of the vehicle; and the target braking force setting section is further configured to adjust the target hydraulic braking force by asymptotically changing from the braking force distribution ratio among the wheels at the start of braking to a target braking force distribution ratio among the wheels with a passage of time from the start of the braking.

8. The vehicle braking control system according to claim 1, wherein the braking mode selecting section is further configured to include an electric power maintenance priority mode as one of the braking modes.

9. The vehicle braking control system according to claim 1, wherein the braking mode selecting section is further configured to selectively set one of an electric power maintenance priority mode and a braking response priority mode as the selected braking mode.

10. The vehicle braking control system according to claim 1, wherein the braking mode selecting section is further configured to set one of the braking modes either manually by a driver or automatically based on a driving condition.

11. A vehicle braking control system comprising:

a braking mode selecting section configured to set one of a plurality of braking modes as a selected braking mode, with each of the braking modes having a different braking control priority for setting a target regenerative braking force, a target hydraulic braking force and a target electric braking force;

a required braking force determining section configured to determine a required braking force for an entire vehicle; and a target braking force setting section configured to set the target regenerative braking force, the target hydraulic braking force, and the target electric braking force based on the braking control priority of the selected braking mode to produce the required braking force for the entire vehicle, the target braking force setting section is further configured to first set the target regenerative braking force to be produced, second set the target hydraulic braking force to be produced based on the target regenerative braking force previously set and the required braking force for the entire vehicle, and third set the target electric braking force to be produced based on the target regenerative braking force and target hydraulic braking force that were previously set, such that the required braking force for the entire vehicle is produced, when an electric power maintenance priority mode is selected as the selected braking mode.

12. The vehicle braking control system according to claim 11, wherein the braking mode selecting section is further configured to include a braking response priority mode as one of braking modes.

13. The vehicle braking control system according to claim 12, wherein the target braking force setting section is further configured to first set the target regenerative braking force to be produced, second set the target electric braking force to be produced based on the target regenerative braking force previously set and the required braking force for the entire vehicle, and third set the target hydraulic braking force to be produced based on the target regenerative braking force and target electric braking force that were the previously set and the required braking force for the entire vehicle, such that the required braking force for the entire vehicle is produced, when the braking response priority mode is selected.

14. The vehicle braking control system according to claim 13, wherein
the target braking force setting section is further configured to set the target regenerative braking force and the target electric braking force to values that substantially maximize a regenerative braking force that can be generated; and
the target braking force setting section is further configured to set the target hydraulic braking force as a difference between the required braking force for the entire vehicle and a sum of the target regenerative braking force and the target electric braking force.

15. The vehicle braking control system according to claim 13, wherein
the target braking force setting section is further configured to set a target braking force apportioning ratio having a hydraulic braking force component and an electric braking force component;
the target braking force setting section is further configured to set the target regenerative braking force to a value that substantially maximizes a regenerative braking force that can be generated;
the target braking force setting section is further configured to set a difference between the required braking force for the entire vehicle and the target regenerative braking force as a combined target hydraulic/electric braking force; and
the target braking force setting section is further configured to set the target hydraulic braking force and the target electric braking force by apportioning the combined target hydraulic/electric braking force between the target hydraulic braking force and the target electric braking force based on the target braking force apportioning ratio.

16. The vehicle braking control system according to claim 13, wherein
the target braking force setting section is further configured to determine the target regenerative braking force to substantially maximize a regenerative braking force that can be generated;
the target braking force setting section is further configured to determine the target electric braking force to substantially maximize an electric braking force that can be produced in view of the target regenerative braking force that was previously set and the required braking force for the entire vehicle; and
the target braking force setting section is further configured to set the target hydraulic braking force as a difference between the required braking force for the entire vehicle and a sum of the target regenerative braking force and the target electric braking force.

17. The vehicle braking control system according to claim 1, further comprising
a braking force distribution ratio determining section configured to determine a braking force distribution ratio among a set of wheels at a start of braking from the target regenerative braking force, the target hydraulic braking force, and the target electric braking force;
the braking force distribution ratio determining section being further configured to determine the target braking force distribution ratio among the wheels from at least one operating condition of the vehicle; and
the target braking force setting section is further configured to adjust the target hydraulic braking force by asymptotically changing from the braking force distribution ratio among the wheels at the start of braking to a target braking force distribution ratio among the wheels with a passage of time from the start of the braking.

18. The vehicle braking control system according to claim 11, wherein
the target braking force setting section is further configured to adjust the target electric braking force to substantially maintain electric power consumption of an electric braking device within a limited range.

19. The vehicle braking control system according to claim 18, wherein
the target braking force setting section is further configured to determine the electric power consumption by the electric braking device based on a power supply voltage and a consumed current of the electric braking device; and
the target braking force setting section is further configured to adjust the target electric braking force so that the electric power consumption of by the electric braking device does not exceed an upper limit value of the limited range.

20. The vehicle braking control system according to claim 18, wherein
the target braking force setting section is further configured to determine the electric power consumption by the electric braking device based on a drive command of the electric braking device; and
the target braking force setting section is further configured to adjust the target electric braking force so that the electric power consumption of by the electric braking device does not exceed an upper limit value of the limited range.

21. The vehicle braking control system according to claim 18, wherein
the target braking force setting section is further configured to determine the electric power consumption by the electric braking device based on an operating speed and an operating force of the electric braking device; and
the target braking force setting section is further configured to adjust the target electric braking force so that the electric power consumption of by the electric braking device does not exceed an upper limit value of the limited range.

22. The vehicle braking control system according to claim 18, wherein
the target braking force setting section is further configured to adjust the upper limit value of the limited range related to the electric power consumption such that the upper limit value of the limited range is increased on at least one of a battery charging condition improving and a quantity of charge to a battery increasing, and less electric power being drawn from the battery, which is a power supply of the electric braking device.

23. The vehicle braking control system according to claim 11, wherein the target braking force setting section is further configured to set the target regenerative braking force and the target hydraulic braking force to values that substantially maximize a regenerative braking force that can be generated; and the target braking force setting section is further configured to set the target electric braking force as a difference between the required braking force for the entire vehicle and a sum of the target regenerative braking force and the target hydraulic braking force.

24. The vehicle braking control system according to claim 11, wherein the target braking force setting section is further configured to set the target regenerative braking force to a value that substantially maximizes a regenerative braking force that can be generated;

the target braking force setting section is further configured to set a target braking force apportioning ratio having a hydraulic braking force component and an electric braking force component;

the target braking force setting section is further configured to set a difference between the required braking force for the entire vehicle and the target regenerative braking force as a combined target hydraulic/electric braking force; and the target braking force setting section is further configured to set the target hydraulic braking force and the target electric braking force by apportioning the combined target hydraulic/electric braking force between the target hydraulic braking force and the target electric braking force based on the target braking force apportioning ratio.

25. The vehicle braking control system according to claim 11, wherein the target braking force setting section is further configured to set the target regenerative braking force to a value that substantially maximize a regenerative braking force that can be generated;

the target braking force setting section is further configured to set the target hydraulic braking force by maximizing a hydraulic braking force that can be produced in view of the target regenerative braking force that was previously set and the required braking force for the entire vehicle; and the target braking force setting section is further configured to set the target electric braking force as a difference between the required braking force for the entire vehicle and a sum of the target regenerative braking force and the target hydraulic braking force.

26. The vehicle braking control system according to claim 11, further comprising a braking force distribution ratio determining section configured to determine a braking force distribution ratio among a set of wheels at a start of braking from the target regenerative braking force, the target hydraulic braking force, and the target electric braking force;

the braking force distribution ratio determining section being further configured to determine the target braking force distribution ratio among the wheels based on at least one operating condition of the vehicle; and the target braking force setting section is further configured to adjust the target electric braking force by asymptotically changing from the braking force distribution ratio among the wheels at the start of braking to a target braking force distribution ratio among the wheels with a passage of time from the start of the braking.

27. A vehicle braking control system comprising:

braking mode selecting means for setting one of a plurality of braking modes as a selected braking mode, with each of the braking modes having a different braking control priority with a different sequence for setting a target regenerative braking force, a target hydraulic braking force and a target electric braking force;

required braking force determining means for determining a required braking force for an entire vehicle; and target braking force setting means for setting the target regenerative braking force, the target hydraulic braking force, and the target electric braking force based on the braking control priority of the selected braking mode to produce the required braking force for the entire vehicle.

28. A method of controlling a vehicle braking control system comprising:

setting one of a plurality of braking modes as a selected braking mode, with each of the braking modes having a different braking control priority with a different sequence for setting a target regenerative braking force, a target hydraulic braking force and a target electric braking force;

determining a required braking force for an entire vehicle; and setting the target regenerative braking force, the target hydraulic braking force, and the target electric braking force based on the braking control priority of the selected braking mode to produce the required braking force for the entire vehicle.

* * * * *